March 31, 1936.  A. KÄMPFER  2,036,146
REFLECTING SIGN
Filed Oct. 4, 1934
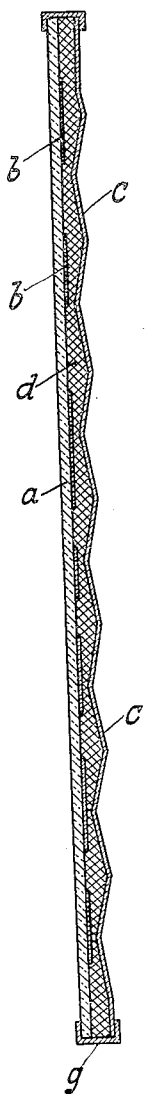
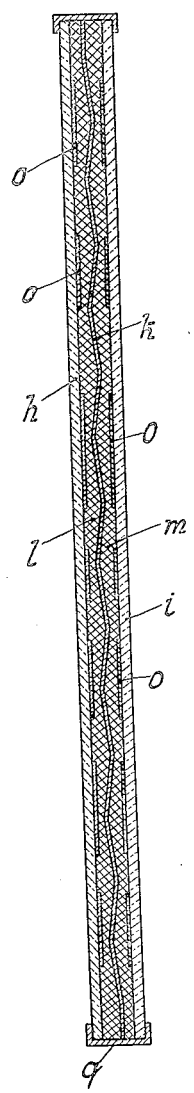
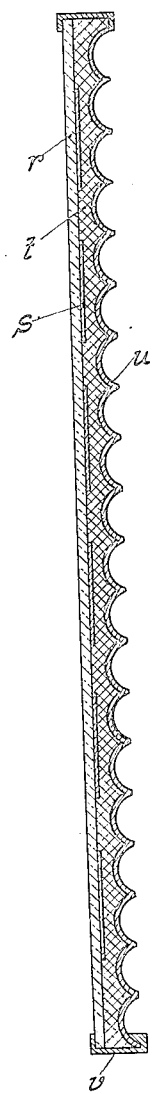
Inventor
Adolf Kämpfer Patented Mar. 31, 1936

2,036,146

UNITED STATES PATENT OFFICE 2,036,146

REFLECTING SIGN

Adolf Kämpfer, Berlin-Charlottenburg, Germany

Application October 4, 1934, Serial No. 746,869
In Germany October 9, 1933

18 Claims. (Cl. 40—135)

The invention refers to reflecting signs such as are used for example for signals, as warning or indicating signs, or for advertising purposes, and in which a reflector, which may be faceted, is arranged behind a transparent carrier for the wording or design.

The previously known reflecting signs of this type, the reflectors of which as a rule consist of a glass plate with the back ribbed and silvered in order to form facets, have various disadvantages. In particular there is a great loss of light energy due to the fact that the light rays before and after reflection have in each case to pass through three glass surfaces, that is a total of six glass surfaces, i. e. the outer and inner surfaces of the carrier of the design and the surface of the reflector glass which faces the latter. At each glass surface a part of the light required for the reflecting action of the sign is lost by internal reflection and refraction. A further objection to the previously known reflecting signs consists in the fact that the wording or design and the silvering of the reflector cannot be sufficiently protected against atmospheric or other harmful influences. Finally the single glass plates can easily be broken, making the whole sign unuseable.

The invention removes these disadvantages. It consists in the carrier of the design and the reflector being combined with one another by means of a transparent and non-splintering intermediate layer having about the same refractive index as the carrier of the design, and prepared by using a plastic or fluid mass. Such materials are well known already. And any synthetic resin made from vinyl compounds, or acryl compounds, or styrol compounds, may be applied for the purpose of my invention. In this way the harmful effects on the light transmission of the opposed surfaces of the carrier of the wording or design and of the reflector are avoided. The two glass plates form an optical unit with the intermediate layer which combines them. On their inward and outward path the light rays need in each case to pass through only one glass surface, i. e. the outer surface of the carrier of the design. Thus a larger proportion of the light energy is used for the intended purpose than previously. Further advantages consist in the fact that the adjacent surfaces of the carrier of the wording or design and of the reflector are cut off from atmospheric or other harmful influences by the intermediate layer. Finally the whole sign also has a high internal elasticity against blows and vibrations or other mechanical stresses. For the same purpose the reflector can also be combined with a protecting plate, arranged behind it, by means of a non-splintering intermediate layer. As the components of the reflector sign are already sufficiently firmly attached to one another by the intermediate layer, the frame of the sign may be made exceptionally simple and light.

In a further development of the invention the reflecting sign is composed of a double-sided reflector and two carriers of the writing or design combined with it. In this way a double-sided reflecting sign is obtained in the simplest way. The possibility of this is due, in the first place, to the employment of intermediate layers which seal the surfaces of the reflectors and protect them effectively against all harmful influences.

Also with regard to the manufacture and the form of the reflector there are new possibilities given by the arrangements of intermediate layers according to the invention. The reflector can for example consist of a metal sheet, stamped in order to form facets, and polished on one or both sides or provided with a reflecting layer on the surface. Such reflectors have not been useable up to the present, as in time the unavoidable atmospheric influences cause them to lose their polish, and because when employing materials of slight mechanical strength the reflectors can easily suffer undesired changes of form. By this new employment of intermediate layers, however, any undesired deformation of the reflector is prevented, as these intermediate layers form a bed for the facets which have been produced by stamping or in any other way.

The intermediate layers can be made of resin, artificial resin, or other organic or inorganic mass, to which plasticizers may be added. This mass is conveniently applied in the plastic or fluid state to the parts to be combined and after removal of the solvent and after combination of the components is transformed into a more or less solid form.

Examples of constructions according to the invention are shown in the accompanying drawing in which:

Fig. 1 shows in cross-section a one-sided reflecting sign.

Fig. 2 shows, also in cross-section, a double-sided reflecting sign.

Fig. 3 illustrates, in a similar view, another shape of reflector.

The reflecting sign shown in Fig. 1 is constructed as follows: The carrier for the wording or design is a front glass plate $a$ on the back face of which, as shown at $b$, there is applied the wording or design or the like spaces of the appropriate shape. At a small distance behind the glass plate $a$ there is a faceted plate $c$, which forms the reflector. The design carrier $a$ and the reflector $c$ are combined with one another by a non-splintering intermediate layer $d$. This intermediate layer is made of resin or artificial resin or of any other suitable organic or inorganic mass, this mass being conveniently applied to the plates which are to be combined in a plastic or fluid state, the solvent being then if necessary removed. The plates are then combined by the known method for the manufacture of safety glass, the intermediate layer retaining a certain elasticity. The reflector sign made up in this way can be provided with a simple frame $g$.

With the reflecting sign according to Fig. 2, two carriers $h$ and $i$ of the design or lettering are arranged on both sides of a double-sided reflector $k$ and combined with this reflector by non-splintering intermediate layers $l$ and $m$. The lettering, design, or the like, or the clearances serving for their formation are arranged on the inner faces, that is those which are towards the reflector $k$, of the design carriers $h$ and $i$ at $o$. The reflector $k$ conveniently consists of a metal sheet which on both sides is either highly polished or provided with a reflecting coating of chromium, nickel, or the like. The facets are formed by corresponding stamping of the metal sheet.

A double-sided reflector can also be formed by arranging a reflecting layer, for example aluminium foil, between two faceted glass plates, and this reflecting layer can be combined with the glass plates by non-splintering intermediate layers.

As in the example shown in Fig. 1, the reflector sign is provided with a frame $q$.

The modified reflector shown in Fig. 3 is very effective in as far as each bulbous projection reflects light rays into a globular space with the result that the lettering or design of the covering plate $r$ can be clearly discerned from any and every position possible in front of the sign. Otherwise, the sign shown in Fig. 3 is composed of the same parts as those shown in Figs. 1 and 2. The covering plate $r$ carries the lettering or design $s$ on its interior surface and the space between the covering plate $r$ and the reflector $u$ is filled up, preferably, by means of a synthetic resin $t$. A frame $v$ embraces these parts.

I have found that any transparent and light proof synthetic resin may be used in conjunction with my invention; such synthetic resins, for instance, as are obtained from polymerized vinyl compounds, polymerized styrol compounds, or polymerized acryl compounds, to which suitable catalysts and plasticizers are added. I prefer to use plasticizers capable of preventing continuation of polymerization under ordinary conditions. I have obtained satisfactory results with such plasticizers as, for instance, dibutyl phthalate, dimethyl phthalate, tributyl phosphate, etc.

What I claim as new and desire to secure by Letters Patent is:—

1. A reflecting sign, comprising, in combination, a transparent covering plate, an opaque embossed light reflector spaced apart from said covering plate, sign forming matter disposed before the inner surface of the plate and a transparent filling mass between said covering plate and said reflector.

2. A reflecting sign, comprising, in combination, a transparent covering plate, a light reflector spaced apart from said covering plate, sign forming matter disposed before the inner surface of the plate and a transparent filling mass between said covering plate and said reflector, said reflector comprising a faceted plate.

3. A reflecting sign, comprising, in combination, a transparent covering plate, a light reflector spaced apart from said covering plate, sign forming matter disposed before the inner surface of the plate and a transparent filling mass between said covering plate and said reflector and having approximately the same refractive index as the substance to be traversed by the entering rays and the reflected rays, said reflector comprising a faceted plate.

4. A reflecting sign, comprising, in combination, a transparent covering plate, a light reflector spaced apart from said covering plate, sign forming matter disposed before the inner surface of the plate and a transparent filling mass between said covering plate and said reflector, the reflector comprising a plate having a plurality of dome-shaped reflecting projections.

5. A reflecting sign, comprising, in combination, a transparent covering plate, a light reflector spaced apart from said covering plate, sign forming matter disposed before the inner surface of the plate, a transparent filling mass between said covering plate and said reflector, said reflector comprising a faceted plate, and a backing for said faceted reflector.

6. A reflecting sign, comprising, in combination, a transparent covering plate, a light reflector spaced apart from said covering plate, sign forming matter disposed before the inner surface of the plate, a transparent filling mass between said covering plate and said reflector, said reflector comprising a faceted plate, and a backing for said faceted reflector and consisting of a similar material as said filling mass.

7. A reflecting sign, comprising, in combination, a transparent covering plate, a light reflector spaced apart from said covering plate, sign forming matter disposed before the inner surface of the plate and transparent synthetic resin entirely filling the space between said covering plate and said reflector, said reflector consisting of a faceted plate.

8. A reflecting sign, comprising, in combination, a transparent covering plate, a light reflector spaced apart from said covering plate, sign forming matter disposed before the inner surface of the plate and transparent synthetic resin entirely filling the space between said covering plate and said reflector and having approximately the same refractive index as the substance to be traversed by the entering rays and the reflected rays, said reflector comprising a faceted plate.

9. A reflecting sign, comprising, in combination, a transparent covering plate, a light reflector spaced apart from said covering plate, sign forming matter disposed before the inner surface of the plate and transparent synthetic resin entirely filling the space between said covering plate and said reflector, the reflector comprising a plate having a plurality of dome-shaped reflecting projections.

10. A reflecting sign, comprising, in combination, a transparent covering plate, a light reflector spaced apart from said covering plate, sign forming matter disposed before the inner surface of the plate, transparent synthetic resin entirely filling the space between said covering plate and said reflector, said reflector comprising a faceted plate, and a backing for said faceted reflector.

11. A reflecting sign, comprising, in combination, a transparent covering plate, a light reflector spaced apart from said covering plate, sign forming matter disposed before the inner surface of the plate, transparent synthetic resin entirely filling the space between said covering plate and said reflector, said reflector comprising a faceted plate, and a backing for said faceted reflector and consisting of a similar material as said filling mass.

12. A reflecting sign, comprising, in combination, a transparent covering plate, an embossed light reflector spaced apart from said covering plate, sign forming matter disposed before the inner surface of the plate and a transparent vinyl compound entirely filling the space between said covering plate and said reflector.

13. A reflecting sign, comprising, in combination, a transparent covering plate, an embossed light reflector spaced apart from said covering plate, sign forming matter disposed before the inner surface of the plate and a transparent acryl compound entirely filling the space between said covering plate and said reflector.

14. A reflecting sign, comprising, in combination, a transparent covering plate, an embossed light reflector spaced apart from said covering plate, sign forming matter disposed before the inner surface of the plate and a transparent styrol compound entirely filling the space between said covering plate and said reflector.

15. A reflecting sign, comprising, in combination, a transparent covering plate, a light reflector spaced apart from said covering plate, sign forming matter disposed before the inner surface of the plate, a transparent filling mass between said covering plate and said reflector, another reflector reflecting light rays in a direction opposite to said first named reflector, a transparent covering plate in front of said last named reflector and spaced apart therefrom, sign forming matter disposed before the inner surface of the second mentioned covering plate, and a transparent filling mass between said last named covering plate and said last named reflector.

16. A reflecting sign including a transparent covering plate, an opaque light reflector spaced apart from said covering plate and having a reflecting surface directed toward the covering plate, sign forming matter disposed adjacent the inner surface of the covering plate, and a transparent filling mass filling the space between said covering plate and said reflector and having approximately the same refractive index as the covering plate.

17. A reflecting sign including a transparent covering plate, an opaque light reflector spaced from said covering plate and having a reflecting surface directed toward the covering plate, sign forming matter disposed adjacent the inner surface of the plate, and transparent synthetic elastic resin entirely filling the space between said covering plate and said reflector and having approximately the same refractive index as the covering plate.

18. A reflecting sign including a light reflector having two oppositely directed reflecting surfaces, a transparent covering plate in front of each light reflecting surface of said reflector and spaced from said reflecting surfaces, sign forming matter disposed adjacent the inner surface of each covering plate, and a transparent filling mass between each covering plate and the respective adjoining light reflective surface of said reflector.

ADOLF KÄMPFER.